(12) United States Patent
Holub et al.

(10) Patent No.: US 9,017,216 B1
(45) Date of Patent: Apr. 28, 2015

(54) ENGINE IGNITION-TRANSMISSION SHIFT INTERLOCK

(71) Applicant: Ford Global Technologies, LLC, Dearborn, MI (US)

(72) Inventors: Patrick K. Holub, Novi, MI (US); David M. Pariseau, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/093,986

(22) Filed: Dec. 2, 2013

(51) Int. Cl.
*B60W 10/00* (2006.01)
*B60W 10/11* (2012.01)
*B60W 10/06* (2006.01)
*B60W 10/196* (2012.01)

(52) U.S. Cl.
CPC ............... *B60W 10/11* (2013.01); *B60W 10/06* (2013.01); *B60W 10/196* (2013.01)

(58) Field of Classification Search
None
See application file for complete search history.

(56) References Cited

U.S. PATENT DOCUMENTS

| 3,977,488 | A | | 8/1976 | Kameyama | |
| 5,646,457 | A | | 7/1997 | Vakavtchiev | |
| 6,043,752 | A | * | 3/2000 | Hisada et al. | 340/5.26 |
| 6,710,472 | B2 | | 3/2004 | Murfin | |
| 6,816,059 | B2 | * | 11/2004 | Yanaka | 340/5.72 |
| 7,298,058 | B2 | * | 11/2007 | Matsubara et al. | 307/10.5 |
| 7,324,879 | B2 | | 1/2008 | Blyden et al. | |
| 7,532,959 | B2 | * | 5/2009 | Ochs et al. | 701/2 |
| 8,862,371 | B2 | * | 10/2014 | Takata et al. | 701/113 |
| 2009/0251284 | A1 | | 10/2009 | Wilson et al. | |
| 2013/0048403 | A1 | | 2/2013 | Doinoff et al. | |
| 2014/0256509 | A1 | * | 9/2014 | Cousins et al. | 477/99 |
| 2014/0278025 | A1 | * | 9/2014 | Flick | 701/113 |

* cited by examiner

*Primary Examiner* — Dirk Wright
(74) *Attorney, Agent, or Firm* — James Dottavio; MacMillan, Sobanski & Todd, LLC

(57) ABSTRACT

A method for controlling a vehicle equipped with a manual transmission and engine includes automatically engaging a brake, locking the transmission in neutral and starting the engine, in response to a signal whose origin is remote from the vehicle representing a desired engine start; and automatically engaging a brake and locking the transmission in neutral in response to a second signal indicating that the driver has exited the vehicle while the engine is running.

15 Claims, 3 Drawing Sheets

ENGINE IGNITION-TRANSMISSION SHIFT INTERLOCK

BACKGROUND OF INVENTION

This invention relates generally to an engine ignition-transmission shift interlock for manual transmission equipped vehicles.

Engine remote starting, wherein a vehicle operator may start the engine prior to entering the vehicle, is available for pre-conditioning the vehicle's passenger compartment and other uses only in automatic transmission equipped vehicles.

Due to a combination of a brake transmission shifter interlock (BTSI) and ignition shutdown controls, today's automatic transmission equipped vehicles are sufficiently secure from unauthorized powered movement during a remote started or secure idle ignition state.

State-of-the-art manual transmissions by comparison have only ignition inhibit/shutdown controls using clutch pedal and/or neutral detection switch inputs available, which cannot completely prevent a powered vehicle movement prior to engine shutdown if an unauthorized drive away is attempted. For this reason, current standard industry practice is not to offer any type of remote start or secure idle functionality on manual transmission equipped vehicles—at the expense of lost customer value and associated vehicle revenue.

SUMMARY OF INVENTION

A method for controlling a vehicle equipped with a manual transmission and engine includes automatically engaging a brake, locking the transmission in neutral and starting the engine, in response to a signal whose origin is remote from the vehicle representing a desired engine start; and automatically engaging a brake and locking the transmission in neutral in response to a second signal indicating that the driver has exited the vehicle while the engine is running.

The method provides additional protection against unauthorized drive-away attempts of a running manual transmission equipped vehicle, thereby expanding the availability of remote start and secure idle features to manual transmission equipped vehicles.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

BRIEF DESCRIPTION OF DRAWINGS

The invention will be more readily understood by reference to the following description, taken with the accompanying drawings, in which.

DETAILED DESCRIPTION

Figure 1:
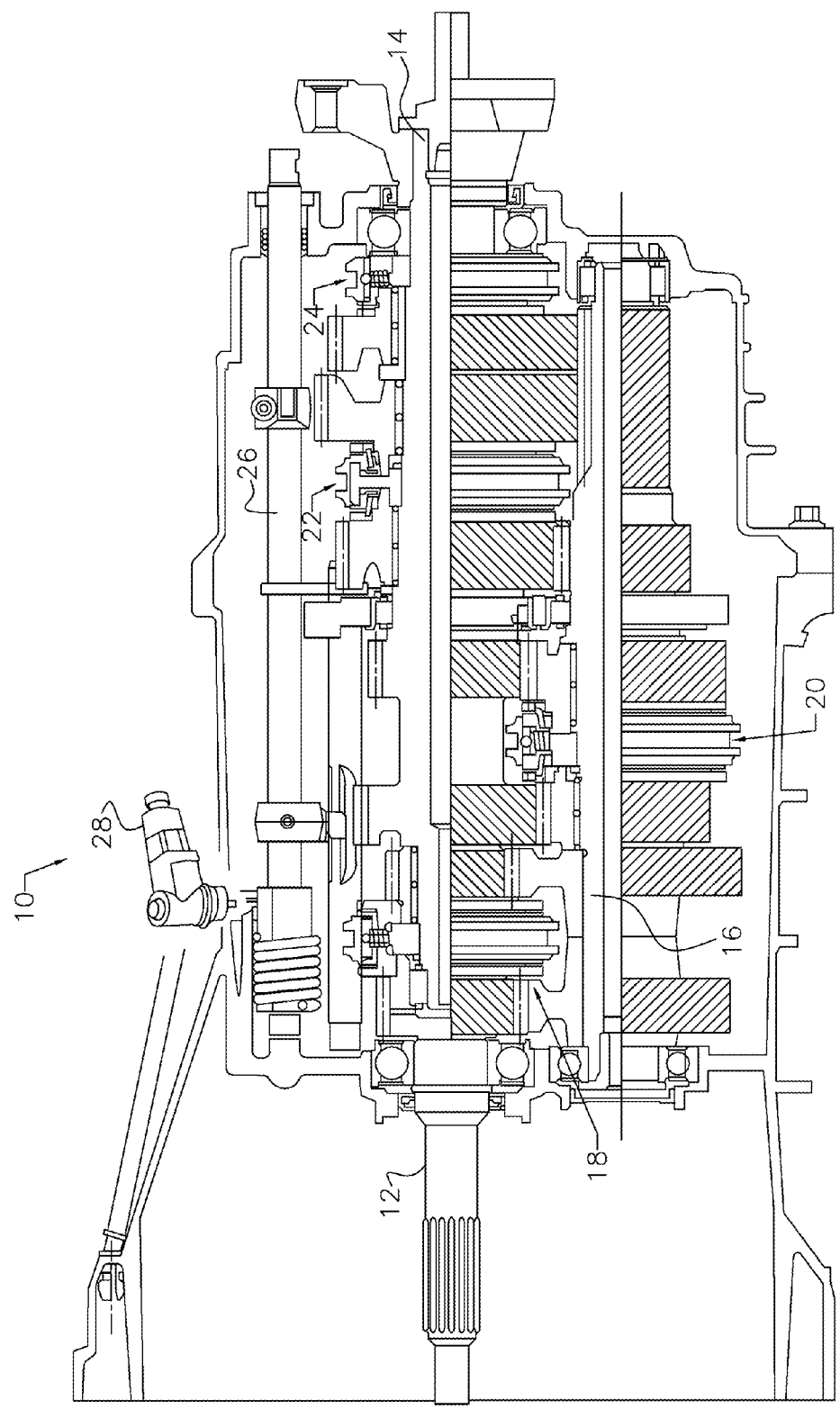
FIG. 1 is a longitudinal cross section of a manual transmission.

The manual transmission 10 illustrated in FIG. 1 includes an input shaft 12 releaseably connected through a clutch (not shown) to an engine shaft (not shown); output shaft 14; layshaft 16; a 5-6 synchronizer 18 for alternately driveably connecting fifth and sixth speed pinions to output shaft 14; a 3-4 synchronizer 20 for alternately driveably connecting third and fourth speed gears to layshaft 16; a 2-1 synchronizer 22 for alternately driveably connecting second and first speed pinions to output shaft 14; a R synchronizer 24 for driveably connecting a reverse gear to output shaft 14; and shift rods 26 supporting shift forks, which move the synchronizers axially in response to movement of a shift selector for producing the selected forward gear 1-6, reverse gear and neutral, in which the transmission 10 produces no drive connection between input shaft 12 and output shaft 14.

The manual transmission 10 includes a solenoid-actuated, spring-returned shift locking mechanism 28 that locks the transmission shift rod axially and/or rotationally in neutral, a switch/sensor in mechanism 28 for monitoring the engagement of the shift lock, and the vehicle includes a park brake with engagement feedback. Powered vehicle movement can be controlled sufficiently to allow the addition of remote start and secure idle to such manual transmission equipped vehicles.

The control strategy is executed under control of an electronic system which includes an electronic controller that includes a microprocessor and electronic memory for storing control algorithms and a communications bus interconnecting the microprocessor and memory. The controller communicates with the solenoid and sensor of the shift locking mechanism 28.

Figure 2:
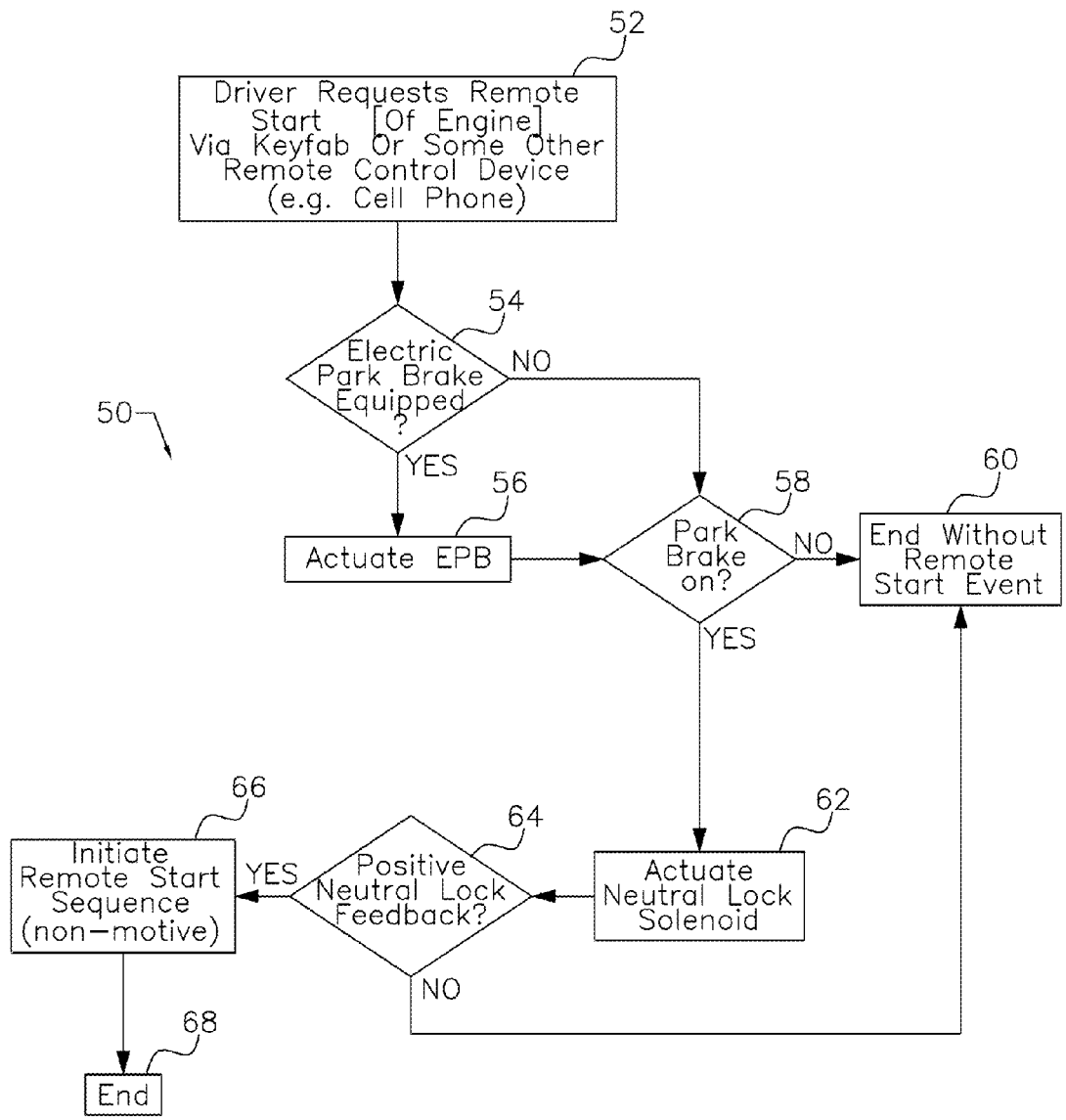
FIG. 2 is flow diagram illustrating the logic for a remote start control.

FIG. 2 illustrates the logic flow for initiating remote-start control 50 (i) for a passive entry passive start (PEPS) vehicle, i.e., a vehicle that electronically recognizes the presence of an authorized driver by non-contact detection (for example radio frequency (RF) communication) of a PEPS key fob in his/her possession for purposes of door lock/unlock and engine start control, or for (ii) a vehicle that requires a bladed key to be inserted into a ignition lock in order to start the engine.

The initial conditions for attempting remote-start control 50 for a vehicle equipped with a manual transmission 10 include the engine being OFF, the vehicle being stationary, and the doors being locked.

At step 52 a request for a remote engine start is produced via a transponder, key fob, or another device remote from the vehicle, such as a cell phone.

At step 54 a test is performed to determine whether the vehicle is equipped with an electric park brake. If the result of test 54 is logically positive, at step 56 the electric park brake is actuated, i.e., the brake is applied.

If the result of test 54 is logically negative or after executing step 56, at step 58 a test is performed to determine whether the electric (or manual) park brake is applied.

If the result of test 58 is negative, at step 60 the attempt to initiate remote start control is terminated.

If the result of test 58 is positive, at step 62 the neutral lock solenoid 28 is actuated, thereby holding transmission 10 in neutral and its sensor producing a signal indicating that the transmission is fully locked in neutral.

At step 64 a test is performed to determine whether a signal indicating that the transmission is fully locked in neutral has been received by the control module controlling the remote start sequence. This control module may be, for example, a body control module that is connected to the remote radio frequency (RF) receiver.

If the result of test 64 is negative, control advances to step 60.

If the result of test 64 is positive, at step 66 a non-motive remote start is produced, i.e., the engine is started, but the vehicle cannot be moved because transmission 10 remains locked in neutral. Initiation of remote start control terminates at step 68. The vehicle state can become motive when the PEPS key fob enters the vehicle or the bladed key is placed in the engine ignition lock.

Figure 3:
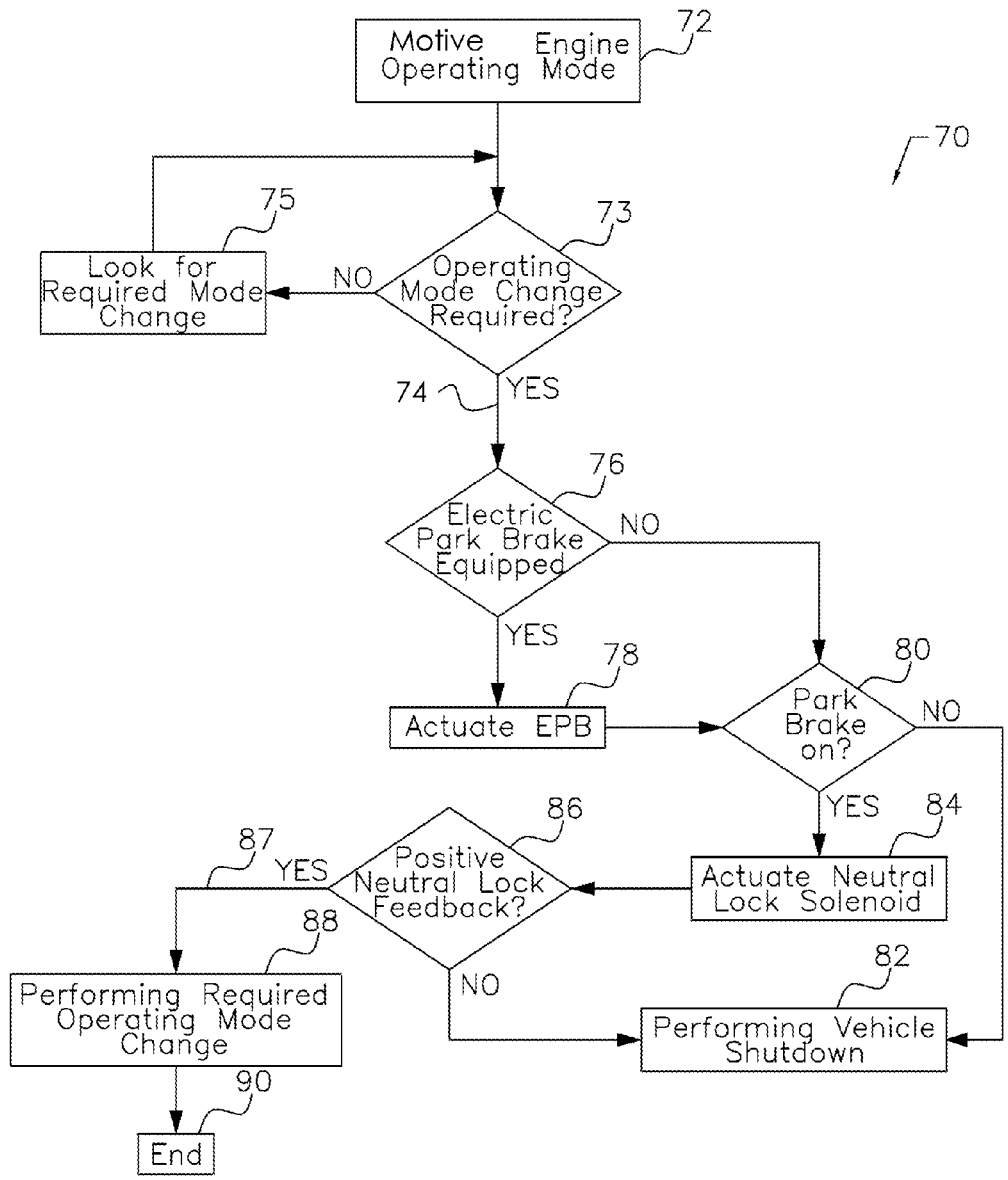
FIG. 3 is flow diagram illustrating the logic for a secure idle control.

FIG. 3 illustrates the logic flow for initiating secure-idle control 70 applicable to a PEPS vehicle, i.e., a vehicle that the operator can exit while running and move away from while carrying the vehicle's key fob.

The initial conditions for attempting secure-idle control 70 for a vehicle equipped with a manual transmission 10 include the engine being ON and the vehicle state being motive, i.e., able to drive away.

At step 72 the vehicle state is in motive mode.

At step 73 a test is performed to determine whether a change in the vehicle's operating mode is required, such as may result from a signal 74 electronically indicating the absence of the PEPS key fob in the vehicle or an occupant seat sensor or switch indicating that the vehicle operator is in the process of exiting, or has exited, the running vehicle. If the result of test 73 is negative, at step 75 the system continues to monitor for a required change in the vehicle's operating mode, in which case control returns to step 73.

At step 76 a test is performed to determine whether the vehicle is equipped with an electric park brake. If the result of test 76 is positive, at step 78 the electric park brake is actuated, i.e., the park brake is applied.

If the result of test 76 is negative or following step 78, at step 80 a test is made to determine whether the electric (or manual) park brake is applied. If the result of test 80 is negative, at step 82 the control system turns the engine OFF and the secure idle control is not initiated.

If the result of test 80 is positive, at step 84 the neutral lock solenoid 28 is actuated, thereby holding transmission 10 in neutral and producing a signal indicating that the transmission is fully locked in neutral.

At step 86 a test is performed to determine whether a signal 87 indicating that the transmission is fully locked in neutral has been produced.

If the result of test 86 is negative, control advances to step 82.

If the result of test 86 is positive, at step 88 the required change in operating mode is performed, i.e., initiate secure idle control (the vehicle is placed in the non-motive state by maintaining transmission 10 in neutral), whereupon initiation of secure idle control terminates at step 90.

Readying such an equipped vehicle for remote start or secure idle usage simply involves shifting transmission 10 to neutral and activating a park brake prior to leaving the vehicle. If the engine ignition is ON and the vehicle is stationary when the driver's door is opened, the transmission shift interlock 28 is activated to allow secure-idle functionality. In the absence of positive transmission lock state feedback or park brake activation, secure-idle would not be activated and corresponding warning messages/alarms and/or ignition shutdown would result. Exit from secure-idle mode would deactivate the transmission shift interlock solenoid 28 and return the vehicle to normal operation.

If the engine ignition is OFF when the driver's door is opened, the transmission shift interlock 28 would not be activated until needed. If a remote start event is later requested, the same sequence of park brake and transmission shift interlock activation and feedbacks would be the prerequisite for remote start ignition activation. Using this electromechanical set-up and control logic minimizes required electrical load and maximizes unlock reliability of the locking device.

For electric park brake equipped vehicles, automatic park brake activation that is integrated into these secure-idle and/or remote-start activation sequences may eliminate feature activation faults in situations when the driver fails to manually activate the park brake.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle equipped with a manual transmission and engine, comprising:
   (a) automatically engaging a brake, locking the transmission in neutral and starting the engine, in response to a signal whose origin is remote from the vehicle representing a desired engine start;
   (b) automatically engaging a brake and locking the transmission in neutral in response to a second signal indicating that a driver is exiting the vehicle while the engine is running.

2. The method of claim 1, wherein step (a) is executed provided doors of the vehicle are locked.

3. The method of claim 1, wherein step (b) is executed provided the second signal indicates that a vehicle door has opened.

4. The method of claim 1, wherein step (b) further comprises producing a third signal indicating that the brake is engaged and the transmission is locked in neutral.

5. The method of claim 4, further comprising automatically turning the engine off provided the third signal is absent.

6. A method for controlling a vehicle equipped with a manual transmission and engine, comprising:
   (a) automatically locking the transmission in neutral and starting the engine in response to a signal whose origin is remote from the vehicle representing a desired engine start;
   (b) automatically locking the transmission in neutral in response to a second signal indicating that a driver is exiting the vehicle while the engine is running.

7. The method of claim 6, wherein step (a) is executed provided doors of the vehicle are locked.

8. The method of claim 6, wherein step (b) is executed provided the second signal indicates that a vehicle door has opened.

9. The method of claim 6, wherein step (b) further comprises producing a third signal indicating that the transmission is locked in neutral.

10. The method of claim 9, further comprising automatically turning the engine off provided the third signal is absent.

11. A method for controlling a vehicle equipped with a manual transmission and engine, comprising:
    (a) determining if a parking brake is engaged;
    (b) if the parking brake is engaged, automatically locking the transmission in neutral and starting the engine, in response to a signal whose origin is remote from the vehicle representing a desired engine start;
    (c) if an indication that a driver is exiting the vehicle while the engine is running is detected, and the parking brake is engaged, automatically locking the transmission in neutral.

12. The method of claim 11, wherein step (b) is executed provided doors of the vehicle are locked.

13. The method of claim 11, wherein step (c) is executed provided a second signal indicates that a vehicle door has opened.

14. The method of claim 11, wherein step (c) further comprises producing a second signal indicating that the brake is engaged and the transmission is locked in neutral.

15. The method of claim 14, further comprising automatically turning the engine off provided the second signal is absent.

\* \* \* \* \*